United States Patent
Lapidos-Salaiz

(10) Patent No.: US 10,740,744 B2
(45) Date of Patent: Aug. 11, 2020

(54) FAST CART

(71) Applicant: Ilana Lapidos-Salaiz, Haymarket, VA (US)

(72) Inventor: Ilana Lapidos-Salaiz, Haymarket, VA (US)

(*) Notice: Subject to any disclaimer, the term of this patent is extended or adjusted under 35 U.S.C. 154(b) by 0 days.

(21) Appl. No.: 16/233,125

(22) Filed: Dec. 27, 2018

(65) Prior Publication Data

US 2020/0210982 A1    Jul. 2, 2020

(51) Int. Cl.
| | |
|---|---|
| G06K 7/00 | (2006.01) |
| G06Q 20/20 | (2012.01) |
| G07G 1/00 | (2006.01) |
| G06Q 30/06 | (2012.01) |
| B62B 3/14 | (2006.01) |
| B62B 5/00 | (2006.01) |

(52) U.S. Cl.
CPC ......... *G06Q 20/208* (2013.01); *B62B 3/1416* (2013.01); *B62B 3/1424* (2013.01); *B62B 5/0096* (2013.01); *G06Q 30/0633* (2013.01); *G07G 1/009* (2013.01)

(58) Field of Classification Search
CPC ...... G06K 9/00; G07G 1/0045; G07G 1/0036; G07G 1/0072; G06Q 20/20; G06Q 20/208
USPC ........................................ 235/435, 383, 385
See application file for complete search history.

(56) References Cited

U.S. PATENT DOCUMENTS

| | | | |
|---|---|---|---|
| 5,250,789 A | 10/1993 | Johnsen | |
| 5,418,354 A | 5/1995 | Halling | |
| 5,424,524 A | 6/1995 | Ruppert | |
| 6,910,697 B2 | 6/2005 | Varatharajah | |
| 6,997,382 B1 | 2/2006 | Bhri | |
| 2015/0127496 A1* | 5/2015 | Marathe | G06Q 10/087 705/28 |
| 2018/0099185 A1* | 4/2018 | Jones | G16H 20/30 |
| 2018/0315011 A1* | 11/2018 | Clarke | G07G 1/0081 |

* cited by examiner

Primary Examiner — Daniel St Cyr
(74) Attorney, Agent, or Firm — Gregory MacDonald

(57) ABSTRACT

The present invention involves using an advanced shopping cart, which enables customers to scan products to be purchased immediately upon selection before placing them in the cart, view the total, view the nutritional value of each product as it is scanned, and complete the transaction by means of self-checkout without standing in line. This advanced shopping cart acts as a client in a wireless network environment, which communicates with the server by means of a computer operating system. It may scan the products selected by the customer, display the cost of these products, and display the total cost of all these products. Products placed in the cart may be displayed on a graphic display. Upon the shopper's completion of product selection, the user may be prompted to proceed to a payment method that may accept debit or credit cards to complete the transaction.

18 Claims, 7 Drawing Sheets

FAST CART

CROSS-REFERENCE TO RELATED APPLICATION

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to scanning and paying for items at a retail store or food market. More specifically, the present invention relates to a scanning and point of payment system to be used by customers while shopping.

2. Description of Related Art

In the past grocery stores did not have shopping carts. A customer would ask the clerk for the items he intended to purchase and the clerk would go around the store, gather and package the items, and total the price of the purchase for the customer.

When shopping carts were first introduced to stores, the common wisdom was that the customers would never find the items they wanted without help. As customers grew accustomed to the layout of the stores, the stores were able to service more customers with fewer employees.

The shopping cart allows store employees to concentrate on stocking the shelves and checking out customers. The store's employees no longer have to gather items for customers. This results in improved productivity for grocery stores, which in turn results in either lower prices for the consumer, higher profit for grocery stores, or both.

As stores with shopping carts became accepted, the major labor cost of checking out customers remains. The persons who check out customers, who are often called "checkers," are required to first hand enter the price of each item into the cash register, and then place each item in a bag. This is a slow and inaccurate process, and is a major bottleneck in the grocery sales process. This problem was only partially alleviated by introducing barcodes on products, so that the barcode could be scanned at checkout. This has allowed the checkers to greatly increase their productivity and accuracy. It also greatly improved inventory management and purchasing accuracy. However, customer lines at checkouts have not been significantly reduced, since most stores used this productivity advantage to reduce the number of checkers to offset the cost of the barcode scanning equipment.

One of the major complaints that shoppers currently have is waiting in line to be checked out, waiting for the checker to scan each item, and waiting for the checker to bag each item. Although most stores have numerous checkout lanes, these lanes remain mostly unused except during peak hours and days, such as Saturday afternoons. This results in a large area of the store having a low utilization. A limited number of self-checkout registers are available in some retail stores. However, this still results in long ques as shoppers have to wait their turn, while the customer at the register scans and bags her individual items, under the watchful eye of retail assistants who serve to mainly ensure that all goods are accurately scanned.

Thus, conventional shopping methods are inefficient, slow, and expensive. Thus, the need exists for a method or system to improve the shopping experience that is efficient, quick, and inexpensive.

BRIEF SUMMARY OF THE INVENTION

It is a principal object to solve at least one of the disadvantages with other attempted solutions or to create other utility by providing a method or system to improve the shopping experience that is efficient, quick, and inexpensive.

The present invention involves using an advanced shopping cart, which enables customers to scan the products to be purchased immediately upon selection by placing them in the cart, view the total, and complete the transaction by means of self-checkout.

The object of this invention is to provide an advanced shopping cart that enables customers to scan the products immediately upon selection by placing them in the cart, view the current total, and complete the transaction by means of automated checkout process, without standing in line.

This invention relates to an electronic advanced shopping cart which acts as a client in the wireless network environment. It communicates with the server by means of a computer operating system. It may scan the products selected by the customer, display the cost of these products, and display the total cost of all these products. Products placed in the cart may be displayed on a graphic display. Upon the shopper's completion of product selection, the user may be prompted to proceed to a payment method that may accept debit or credit cards to complete the transaction. Alternative is to have the credit cards linked to the turnstile/pedestrian speed gate at point of exit, in which case cash may also be used.

Another object of the invention is to provide a security system which protects the merchant by ensuring that only properly paid for products leave the store. Each item will have an RFID security tag which will deactivate once scanned and registered by the system of this invention.

The system of this invention may be used in any retail store, market, etc. The system of this invention may be integrated to sync with any store. Even a store who may potentially be opposed to the system of this invention, because of their own current website or app; the system of this invention app allows for wider range of services and to almost any mobile system.

Herein are described apparatus that assist a shopper during his visit to a store. In one embodiment in the form of an advanced shopping cart, the invention enables a shopper to check himself out of the merchant store.

The advanced shopping cart includes a bar-code scanner and indicator light that will change color. The indicator light may illuminate different colors depending on if the cart is activated and in use, when payment is processed, when payment has not been processed, and when the turnstile barrier is approached. For example, it may turn orange once the cart has been activated and in use, and turns green once payment is processed or red payment has not been processed and the turnstile barrier is approached.

The advanced shopping cart may contain a credit card swipe for the user who does not choose to process payment through the electronic device, which may contain an application that is referred to herein as the "FASTKart" application. The cart body is made from metal and electronic wires. The advanced shopping cart alerts the consumer to the presence of non-scanned goods, it will not allow final checkout to process. Once payment has been processed, a (green) indicator light will go on verifying that the purchase is complete and the customer can go through the gate, since a green indicator will activate the pedestrian speed gate to open. Where payment has not been processed, the indicator light will remain orange. Once the pedestrian speed gate barrier is approached, if payment has not been processed the process payment on the FASTKAST or FASTKart application will turn on a red indicator light or emit a sound. This will also trigger an alarm with the store management, who would be able to rush over to ensure that all is on order.

If using a regular cart (non-FASTKART) and mobile FASTKart app system, goods may be scanned using a mobile device and autopay. This may generate a barcode. The turnstile will not open until the barcode is scanned and accepted.

This invention relates to an electronic advanced shopping cart which acts as a client in the wireless network environment and communicates with the server by means of a computer operating system. It may scan the products selected by the customer, display the cost of current product and the total cost of all the products in the cart by means of a graphic display. Upon completion of product selection, it may prompt the customers to proceed to a payment by autopay with method linked to a profile, or to pay on the spot with a debit or credit card to complete the transaction.

In at least one embodiment, the system may have a credit card linked to the turnstile/pedestrian speed gate at the point of exit. In at least one other embodiment, cash may be used to purchase the products.

Another object of the invention is to provide a security system which protects the merchant by ensuring that only properly paid for products leave the store.

An additional object of the invention is to provide the customer assurance that he will only pay for the items he selects and takes home.

An additional object of the invention is to provide instantaneous feedback regarding the nutritional value of each product as it is scanned to assist the customer in knowing if they are purchasing the desired balance of fat, protein, carbohydrates, calories, sodium, cholesterol, etc. This feedback may include visual or audible feedback on the total or percentage of calories, fat, protein, carbohydrates, calories, sodium, cholesterol, etc. for the items that the user selects from the shopping list or places in the advanced shopping cart.

The device may suggest substituting a particular item for an item with better nutritional value. This may also have features that alert a user if an item is particularly high in sodium, fat, gluten, etc., if the user indicates that he is on a low-sodium diet, a low-fat diet, gluten-free diet, etc. For example, the device may suggest an eat-this-not-that recommendation. This may cause the device to recommend a baked potato chip instead of a traditional one, whole grain bread over typical white bread, lean chicken or fish instead of red meat, etc. The device may also recommend cheaper generic versions of products that are selected, if the user indicates that they are on a diet.

An additional object of the invention is to provide cost information regarding the total cost of each product as it is scanned to assist the customer in knowing the total amount that they are spending as they shop or do a price check.

An additional object of the invention is to allow a consumer to preload a list of items that they wish to purchase. Through GPS or other technology, the system directs consumers through a store to each desired item. The mapping may be set to the shortest route through a store, or another smart route.

For example, in at least one embodiment, the app may be set based on the temperature of items in a grocery store, where the location of unrefrigerated items are identified first, so that they may be placed in the bottom of the cart. Next, the location of refrigerated items are located, followed by frozen items. This method allows the frozen items to be outside of the freezer cases for a shorter amount of time, so that they are still frozen by the time the consumer reaches home, since the time in the cart is minimized.

In at least one other embodiment, the shopping route may be based upon the weight of each item. In this example, the system directs the consumer to first scan and place the heavier items, such as beverages, so that they may be placed on the bottom of the cart. Next, items in boxes are identified. Lastly, more fragile and lighter items such as eggs, bread, and chips are identified, so that they may be the last items to be placed in the cart, so that they are not crushed or broken by heavier items.

In at least one other embodiment of the invention, comparison cost information may be provided, so that cheaper products may be suggested over the ones stated on the consumer's shopping list in case the user is shopping on a budget.

Other objects and advantages of the present invention will become apparent from the following detailed description when viewed in conjunction with the accompanying drawings, which set forth certain embodiments of the invention.

BRIEF DESCRIPTION OF THE DRAWINGS

The accompanying drawings, which are incorporated in and constitute a part of this specification, illustrate several aspects described below.

DETAILED DESCRIPTION OF THE INVENTION

Figure 1:
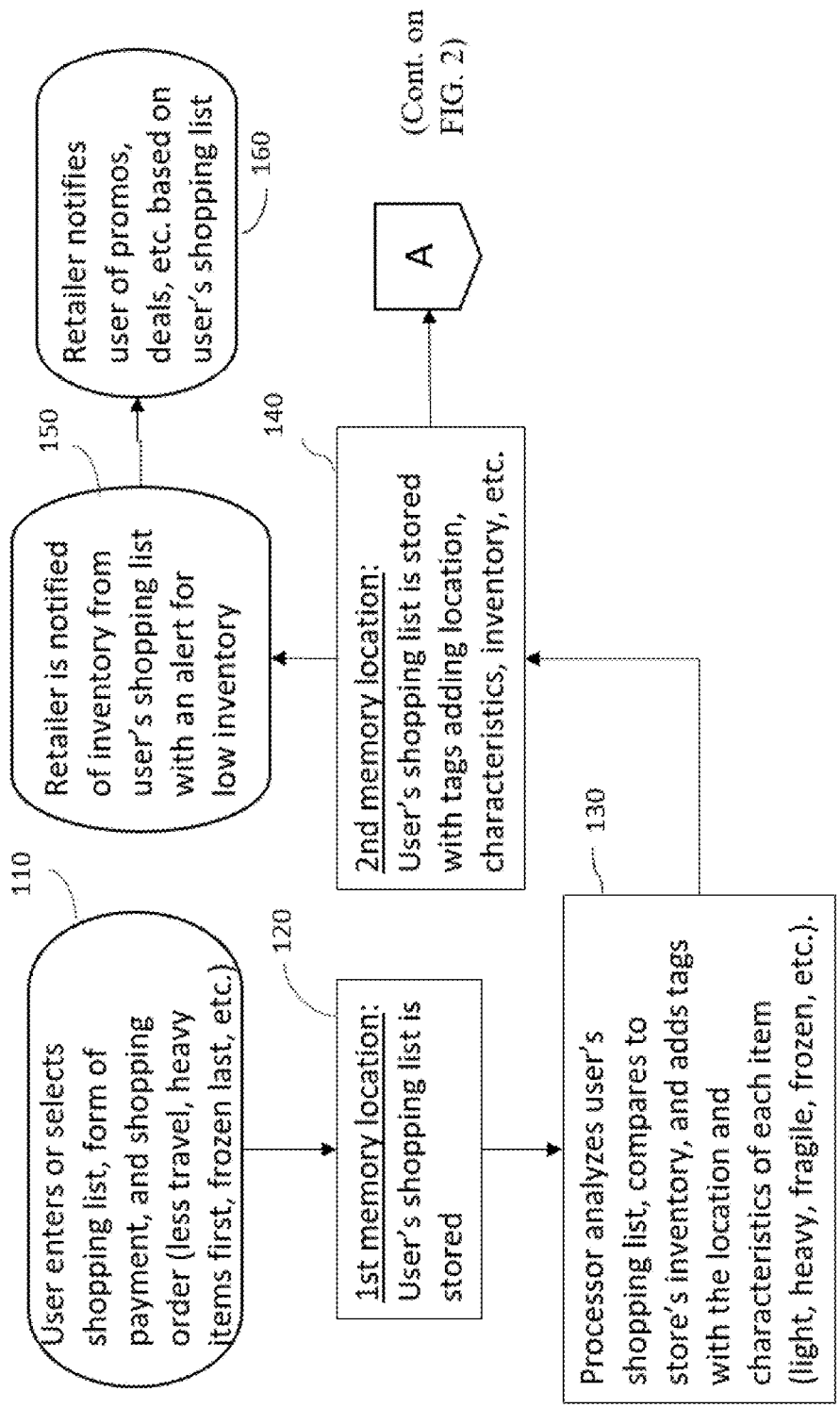
FIG. 1 is a flowchart of the present invention in which at least one of the embodiments of the present invention is shown.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without some of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items.

As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning, which is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The present invention is a system and associated application that allow consumers to checkout of stores faster. It also allows the consumer to shop smarter by shopping based on preference either shopping by the most direct or shortest route, or by placing the heavier and unrefrigerated items on the bottom of the cart, and the lighter or fragile or frozen items on the top of the cart. The system also keeps track of the items being placed in the advanced shopping cart in comparison with a preloaded grocery list to remind the consumer if they forgot to purchase an item or to prioritize items. The system also notifies a consumer if an item is placed in the advanced shopping cart that was not preloaded on the list.

The system comprises using a portable product scanning and payment system, comprising a container having a bottom and at least one side, comprising at least one handle, a barcode scanner, and a point-of-sale device, such as a credit card reader.

The scanning and payment system comprises a container capable of holding products selected from a group consisting of groceries, sundries, foodstuffs, personal care items, toiletries, pet foods, medications, stationary, office supplies, cleaning supplies, personal hygiene supplies, and other household supplies.

The scanning and payment system further comprises a scale attached to the bottom of the container, wherein the scale is capable of measuring the weight of products placed inside the container to compare with the total weight calculated from the information on the barcodes of the products scanned to determine if all of the items placed in the container were properly scanned.

In at least one embodiment, the advanced shopping cart will be configured in sections to allow for the insertion of reusable bags.

The scanning and payment system may also comprise at least one processor that is mounted within the container, wherein the processor is capable of calculating the total cost of the items placed in the container from the information read by the barcode scanner, reading payment information entered into the point-of-sale device, and completing the transaction.

In addition, the scanning and payment system may include at least one wireless radio frequency modem that is capable of connecting to the internet.

In addition, the scanning and payment system comprises a speaker that is mounted on the container, wherein the speaker is capable of transmitting a notification selected from a group consisting of an audible tone, visual lights, vibration through the handle of the container, an electronic notification to a store employee, and a combination of one or more of these methods.

Furthermore, the scanning and payment system comprises a speaker capable of notifying a person if all of the items in the container are not paid for prior to the customer exiting the store through the use of an audible, visual, vibratory, or other alarming means. Moreover, the scanning and payment system may cause the wheels of the cart to auto-lock or a gate to not open, if a user attempts to leave the store without paying for all of the products or items.

The concept for the system of this invention and FASTKart application (app) is driven by one a desire to get out of the store faster. The main objective of the system of this invention and FASTKart app is to facilitate the convenience of avoiding standing in line, and making paperless payments. This may result in an expedited checkout process for persons who love to shop in brick and mortar stores, but do not enjoy waiting in checkout lines. The system of this invention may solve that problem by targeting large and small retail stores, including supermarkets and wholesale retailers, such as Costco, BJs, Target, Giant, Safeway, Raley's, etc., department stores, such as Macys, Kohl's, Sears, etc.; home improvement stores, such as Home Depot, Lowes, etc.; and electronic stores, such as Best-Buy, etc.

The application enables the customers to locate desired products within the store quickly and efficiently by tracking the products with either GPS or a map located on the cart itself or on a mobile system. In at least one embodiment, the GPS of the container system is configured to show the location of products on a map on the display.

Customers may search for products that a store carries, and get details about the product, such as brand, cost, nutrition facts, technical details, etc. Customers may also search for product reviews, such as the best, easiest, most advanced, etc. The app will link to reviews of the products posted by customers on FastKart. The app will also link to other reviews on product websites. In addition, the app will link to sites that test products, such as Consumer Reports.

Customers may also purchase products through an expedited process. In addition, customers may shop and pay for purchases remotely, which may be picked up locally or delivered. Furthermore, customers may use voice prompts to search for products, finalize an order, and checkout.

FIG. 1 is a flowchart of the present invention in which at least one of the embodiments of the present invention is shown. As shown in FIG. 1, a user enters an initial shopping list into a first memory location within an electronic device or selects items on a shopping list 110 that is generated by the store that he is in. Next, the user enters a form of payment 110, which may be selected from the group consisting of credit cards, debit cards, cash, check or other electronic payments such as PayPal, Bitcoin, etc. Next, the user selects the order 110 that he would like to perform his shopping in. For example, if the user selects "less travel", an algorithm stored in an electronic device that will consider the location of all of the items on the shopping list and generate a path of travel from the first item to the last item, which allows all of the items to be purchased with the least amount of walking, which may also be the least amount of time.

The user may select other paths of travel, such as "heavy items first." With this option the algorithm will generate a path with the least amount of walking that allows all of the heavy items to be placed on the bottom of the cart. This will prevent lighter items from being crushed, since they will be purchased last.

The user may select other options for paths of travel, such as "frozen last." With this option the algorithm will generate a path with the least amount of walking that allows all of the non frozen items to be placed in the cart first, and the frozen items to be placed in the cart last. This will allow the frozen items to remain in the freezers in the store the longest, which will mean that they are still frozen when the user returns home.

Also as shown in FIG. 1, the user's shopping list is stored in a first memory location 120. The processor analyzes user's shopping list, compares it to store's inventory, and adds tags 130 with the item's location and characteristics (light, heavy, fragile, frozen, etc.).

The user's shopping list is then stored in a second memory location 140 with tags adding location, characteristics, inventory, etc. Next the retailer is notified of the inventory of each item 150 on the user's shopping list with an alert for low inventory. After that, the retailer may notify the user of promos, deals, etc. 160 based on the user's shopping list. Thus, the application enables a retailer to manage in-house stock. The application also enables a retailer to alert customers of promotions, deals, and new products based on their purchase history of similar products 160.

In at least one other embodiment, a customer may use the FASTKART (shopping basket or cart) without downloading the FASTKart app or registering a profile online. In this embodiment, customers will use the system of this invention to generate a shopping list 110, shop and check out using an electronic form of payment. The consumer will need to select the mode of payment when they pick up the FASTKART 110, which may be selected from the group consisting of payment via debit/credit card by way of a scan or pin input, payment via PayPal or other linked-autopay method.

In at least one embodiment, a customer may use either the advanced shopping cart or a basket plus the FASTKart software application ("app"). In this embodiment, registered users will log onto the FASTKart app using a valid user identity and password (or code) when they retrieve the cart 110. This will facilitate automated "checkout" using the information on file, which will bypass the need for use of an electronic payment on the cart or payment upon exit, at the pedestrian gate.

In at least another embodiment, the FASTKart app may alert the consumer or merchant of goods that are out of stock, and when they are expected to be back in stock 150. In at least one embodiment, the FASTKart app may be used by the retailer to keep stock of inventory on the shelf, update a database each time a product is removed, and alert the merchant when stock is low in real-time time, so that inventory may be replenished in a timely manner 150.

Figure 2:
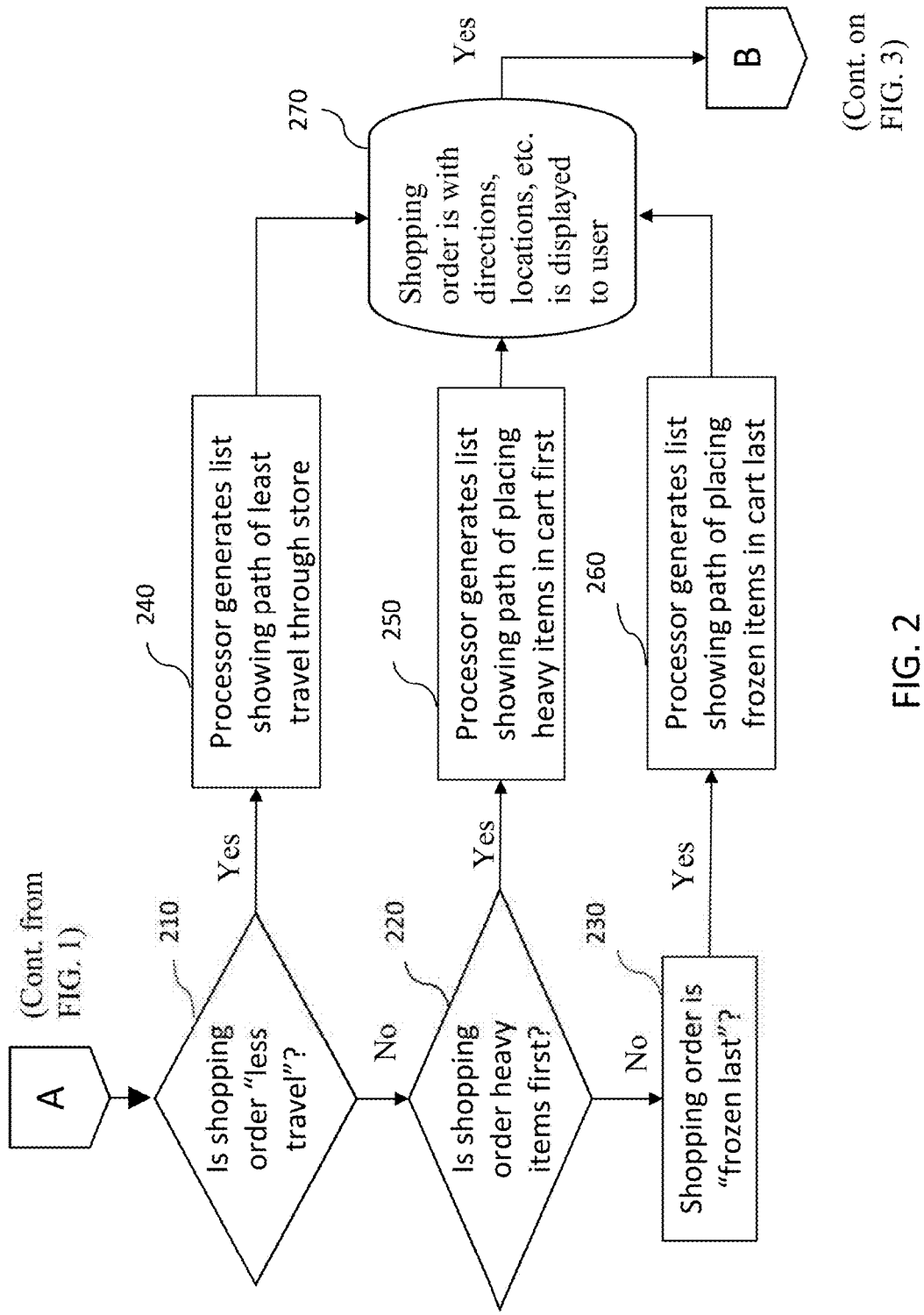
FIG. 2 is another flowchart of the present invention in which at least one of the embodiments of the present invention is shown.

FIG. 2 is another flowchart of the present invention in which at least one of the embodiments of the present invention is shown. Also as shown in FIG. 2, the electronic device preempts the user if the planned shopping order is "less travel" 210. If the user desires a shopping order of "less travel," the processor generates a shopping list showing a path of least travel through the store 240.

Otherwise, the user is asked if he desires a shopping order where the heavy items 220 are selected first. If the user desires a shopping order of "heavy items first," the processor generates a shopping list showing a path of travel through the store where the heavy items can be placed in the cart first 250.

Otherwise, the user is asked if he desires a shopping order where the frozen items are selected last 230. If the user desires a shopping order of "frozen items last," the processor generates a shopping list showing a path of travel through the store where the frozen items are selected last 260. After the user selects the shopping order a shopping list is generated with directions, locations, etc. 270.

Figure 3:
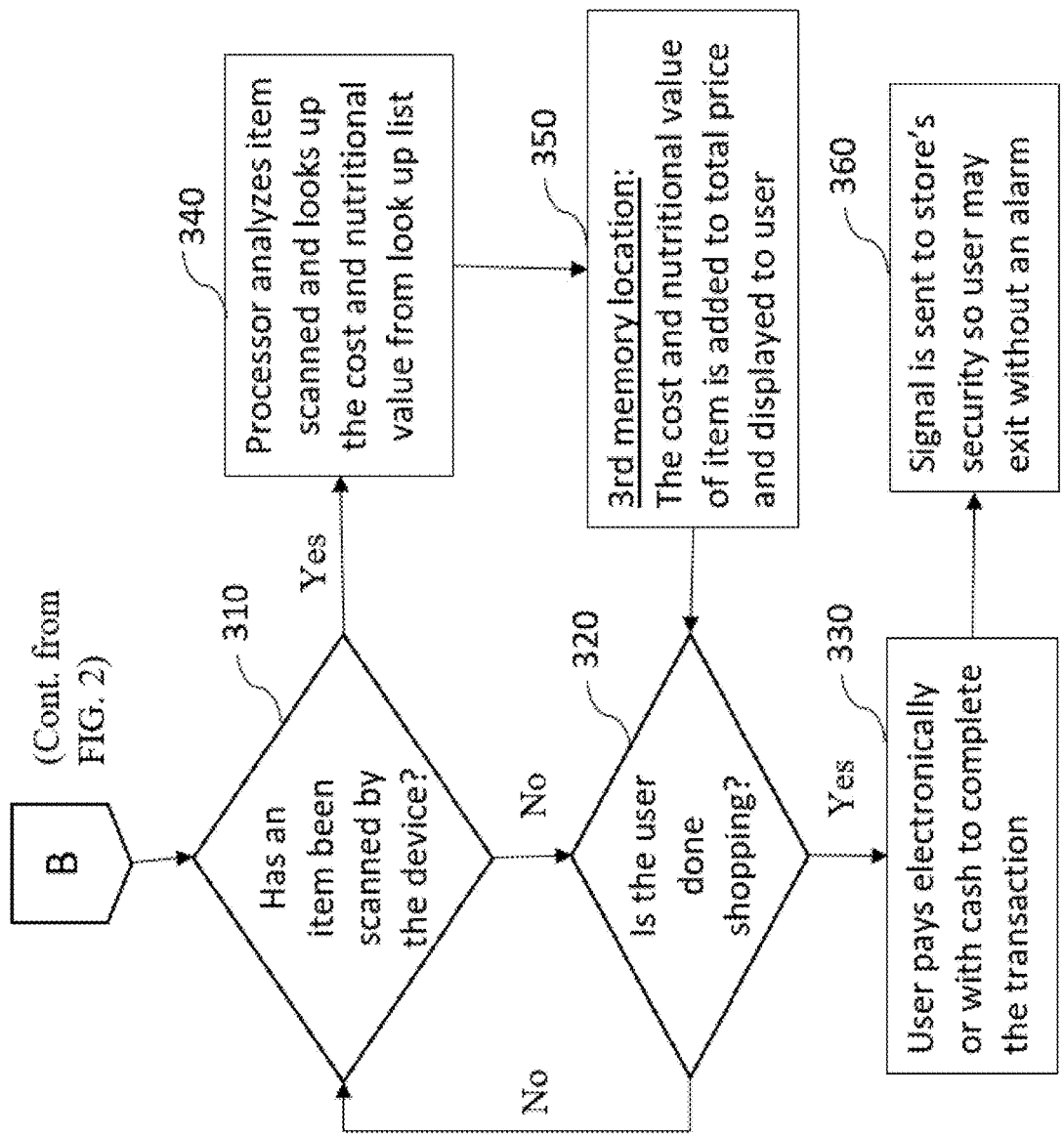
FIG. 3 is a further flowchart of the present invention in which at least one of the embodiments of the present invention is shown.

FIG. 3 is a further flowchart of the present invention in which at least one of the embodiments of the present invention is shown. Also as shown in FIG. 3, the electronic device prompts the user if an item been scanned by the device 310. If so, the processor analyzes item the scanned and looks up the price and nutritional value from look-up list 340. For example, the graphic display on the electronic device may show the nutritional value of each product as it is scanned to assist the user in determining if they are purchasing the desired balance of fat, protein, carbohydrates, calories, sodium, cholesterol, etc. The device may also suggest substituting a particular item for an item with better nutritional value. This may also have features that alert a user if an item is particularly high in sodium, fat, cholesterol, etc., or if it contains gluten or other allergens. In this way the device assists a user, who may be on a low-sodium, low-fat, low cholesterol, or gluten-free diet. For example, the device may suggest an eat-this-not-that recommendation. This may cause the device to recommend a baked potato chip instead of a traditional one, whole grain bread over typical white bread, lean chicken or fish instead of red meat, etc. The device may also recommend cheaper generic versions of products that are selected, if the user indicates that they are on a diet.

Next, the processor adds the price of the item to the total price and displays it to the user 350. The processor also adds the nutritional value of the item to the total nutritional value of the items scanned and displays it to the user 350. Otherwise, the electronic device prompts the user if he is done shopping 320. When the user is done shopping, he is prompted to pay either electronically or with cash to complete the transaction 330. Next, a signal is sent to the store's security so that the user may exit without setting off a speaker or an alarm 360.

In at least yet one other embodiment, a customer may pay with cash at pedestrian gate or manned register and getting a receipt prior to exiting the store 330. When paying with cash, the user may still use the FASTKart app, which may be either downloaded to a mobile system or integrated within a system attached to an advanced shopping cart. In this way, all of the items will already be scanned scan using the mobile system and when being placed in the advanced shopping cart, so checking-out will be faster.

The FASTKart app may be located on a shopping cart or basket (for small purchases). The app may also be downloaded onto a personal mobile system, which may be used with a regular shopping cart. Consumers will have the ability to register a FASTKart account. A profile with account details will be kept on file. The profile may include customer information, such as the customer's name, billing and shipping address, telephone number and electronic payment option (credit or debit cards) or mobile platforms (bank details, PayPal, Samsung pay, Apple pay or any other phone/online viable payment plan).

Use of the FASTKart app may be used with or without a shopping cart or basket. If the user does not use the mobile system or app, the user may still use the system when installed in the shopping cart, which will allow products to be scanned with the bar code scanner, a credit card swipe, or payment with cash prior to exiting the store. This will allow customers who have not downloaded the FASTKart app. on their mobile system to still use and benefit from using the system of this invention.

In at least another embodiment, a customer may shop and pay for products online, and either have them delivered or pick them up. In this embodiment, items the quantity and cost of items will be scanned by an algorithm on a computer as they are placed in a remote online FASTKART shopping cart. The cost of the item will then be charged when the user indicates that they are done shopping with the option to select instore pick-up/curbside pick-up or delivery. The app may then link to the retail outlet service center that is to provide the items. This retail outlet service center may then have an actual shopping cart filled with the customer's desired products while are scanned with the FASTKART apps by either a robot or store employee.

In at least another embodiment, the FASTKart app may create a "shopping list" 120 that may be saved and retrieved on the app. This will eliminate the need to carry an additional shopping list. This will also allow the customer to prioritize items on the list, and locate items on the list 270 in sequence based on the location of the product and automatically check besides the item on the list once the item has been scanned 310. This will minimize searching for products around the store, keep one focused on buying what they came to get, and thus hasten the shopping experience.

In at least another embodiment, the FASTKart app may keep track of favorite items to allow for easy reorder/pick-up with an optional customized alert to reorder/repurchase selected items on a recurring basis. In at least one other embodiment, the FASTKart app may scan for valid storewide promotions, which will reduce the need to search either online, in newspapers, or cut other forms of coupons.

In at least another embodiment, the FASTKart app may be used by the retailer to offer the consumer ongoing promotions in a store, tailor the customers' shopping history, and provide the option to offer daily/weekly/monthly storewide promotions/coupons. These time-saving features may improve cost-efficiency by reducing the need for instore paper based coupons, online coupons, or newspaper coupons or advertisements.

In at least another embodiment, the FASTKart app may be used by consumers, store customers, and store owners/ merchant and product suppliers, who may benefit from the FASTKart app. Everyday users may be the shopper, anyone old enough to make use of a purchase with a verifiable payment option linked to FASTKART and/or app via mobile system. Retailers may serve their customers by providing access to this experience. Retailers may also use the FASTKart app to link directly to their inventory hub as a means to keeping stock of inventory in real time.

In at least another embodiment, customers may pay electronically with Wi-Fi, Bluetooth, etc. 330 The electronic connectivity may link your payment details to the FASTKart shopping cart, the FASTKart app, and existing apps for stores and markets so that the customer can browse products sold within the specific retailer that houses the FASTKART. Businesses may also advertise additional products, information, sales/deals, vouchers, etc. on the FASTKart app.

In at least one other embodiment, when the user logs onto the app, the FASTKART logo is displayed, and the user is requested to sign in using email/phone number and password or create new account or choose an alternate payment option. Next, the user may see the following features (1) an option to enter a shopping list; (2) a search option to look for specific products, including description of item, product detail, reviews and compare similar products; and (3) an option to use a map and/or follow GPS to locate products. The program may then direct the user to follow a particular map or be directed via GPS throughout the store to minimize the distance one would need to walk. The user may enter information by way of a voice or touch option. The user may also select a drop down tab, which includes a checkout payment option.

The user may select a checkout/payment option, which will calculate the items within the FastKart and process payment via the selected payment option. The cost of items will be tallied as the items are scanned, so that the consumer/shopper can have sense of the total amount to be charged as goods are added to the cart. This is an improvement over the current experience of a total only being displayed at the end of the shopping experience. This feature allows the customer to "know as they go" how much they will be spending, rather than waiting until they get to the check-point, which facilitates budgeting.

The consumer exits the store by passing through a pedestrian speed gate, which will open automatically once a transmission (green light) is received that payment has been processed. This transmission may occur when the FASTKART approaches, or scans the receipt barcode on a mobile system, or by inserting/scanning a credit/debit card, cash or valid receipt, such as a secure barcode that is generated at a self-checkout register for those who pay via cash at a register . . . . Failure to complete the payment process will prevent the pedestrian speed gate from opening and may set off an alarm if the boundaries of the sensor are bypassed. This will prevent goods that have not been paid for from exiting the store, and may provide the customer assurance that he will only pay for the items he selects, places in the cart, and takes home.

This automated checkout service may eliminate the need for manned registers, which may reduce the number of employees along with instances of employee theft. Also, employees working within the store may be more readily available to customers who need assistance, providing a prompt and personalized service.

The FASTKart app may be compatible with most mobile systems, including recent IOS and Android platforms. The FASTKart app may also be compatible and work across multiple platforms, such as a tablet, phone, laptop, watch or the actual FASTKART itself. The FastKart app may connect to a database that may also be linked to the entire inventory of the store, allowing the consumer to scan any item in stock and allow for the retailer to manage the stock in this way too.

In at least one other embodiment, all goods will have a coded sensor (RFID), which will allow for processing via the FASTKart app, where the sensor will be deactivated once scanned. This process may be reversed by selecting cancel option for when the consumer removes the item from shopping.

The FASTKART may set off an alarm if the RFID is not deactivated upon payment and the boundaries of the sensor are passed with "RFID active" goods. The retailer may have to install a pedestrian speed gate system that would automatically open once activated by a processed FASTKART, or scanning the FASTKart receipt barcode on mobile system or printed receipt.

In at least one other embodiment, the FASTKart app may be displayed in a language selected from the group consisting of English, Spanish, French, Cantonese, Mandarin, and Vietnamese.

In at least one other embodiment, the FASTKart app may be linked to other various websites selected from the group consisting of stores/retail outlets, and payment platforms. FASTKart app may be integrated with other apps/website of the stores that offer the FastKart service.

Figure 4:
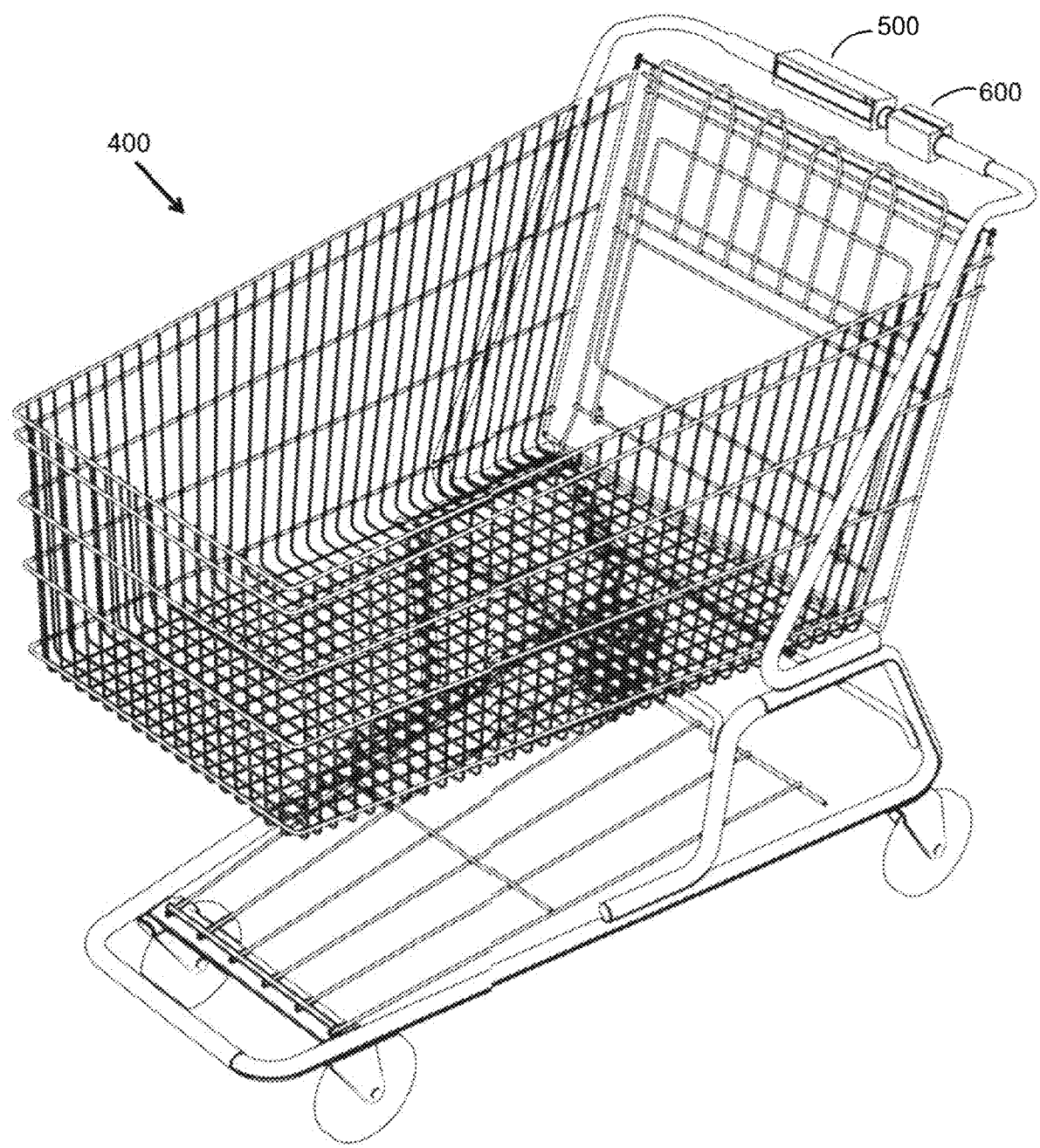
FIG. 4 is a front isometric view of the advanced shopping cart of the present invention in which at least one of the embodiments of the present invention is shown.

FIG. 4 shows a front isometric view of the electronic device 500 and the credit card reader 600 attached to a shopping cart. attached to a shopping cart. In at least one embodiment, as shown in FIG. 4, the electronic device 500 may have a video that is capable of displaying an image of the item sought on the shopping list, advertisements for other items, or entertainment or news videos that a user may wish to view while shopping.

In at least one embodiment, the electronic device 500 may have a speaker or other audible device 500 to alert a customer to a desired product, a similar product on sale, directions throughout the store, the price of an item scanned, etc. The speaker may also play music or the audible portion of a video.

In at least one embodiment, the electronic device 500 may have a microphone or other audible device 500 where a customer may ask the location of a desired product, if there are similar products at a lower price, the total of items in the advanced shopping cart so far, etc.

Consumers can pay via electronic payments technology (credit or debit cards), and mobile platforms (bank details, PayPal, Samsung pay, Apple pay or any other electronic payment or pay cash to the store before exiting.

The FastKart App. will be linked to the FASTKART shopping cart/basket and should be used simultaneously to maximize its efficiency. However, one could shop by FASTKart app only using a regular cart/basket and using the FASTKart app to scan and charge goods and vice versa—use the FASTKART and pay cash or card prior to exiting the store.

Figure 5:
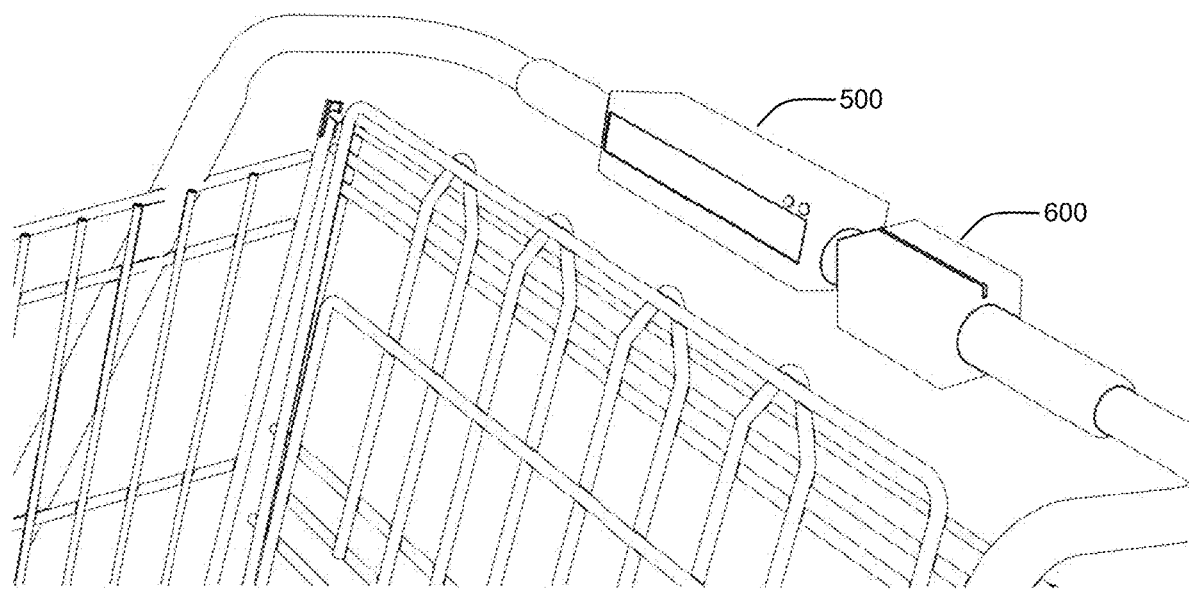
FIG. 5 is a close up of the front isometric view of the advanced shopping cart of the present invention showing the location of an electronic device to assist a user in shopping and a credit card reader where a user may remotely pay for her purchases that attaches to an advanced shopping cart in which at least one of the embodiments of the present invention is shown.
Figure 6:
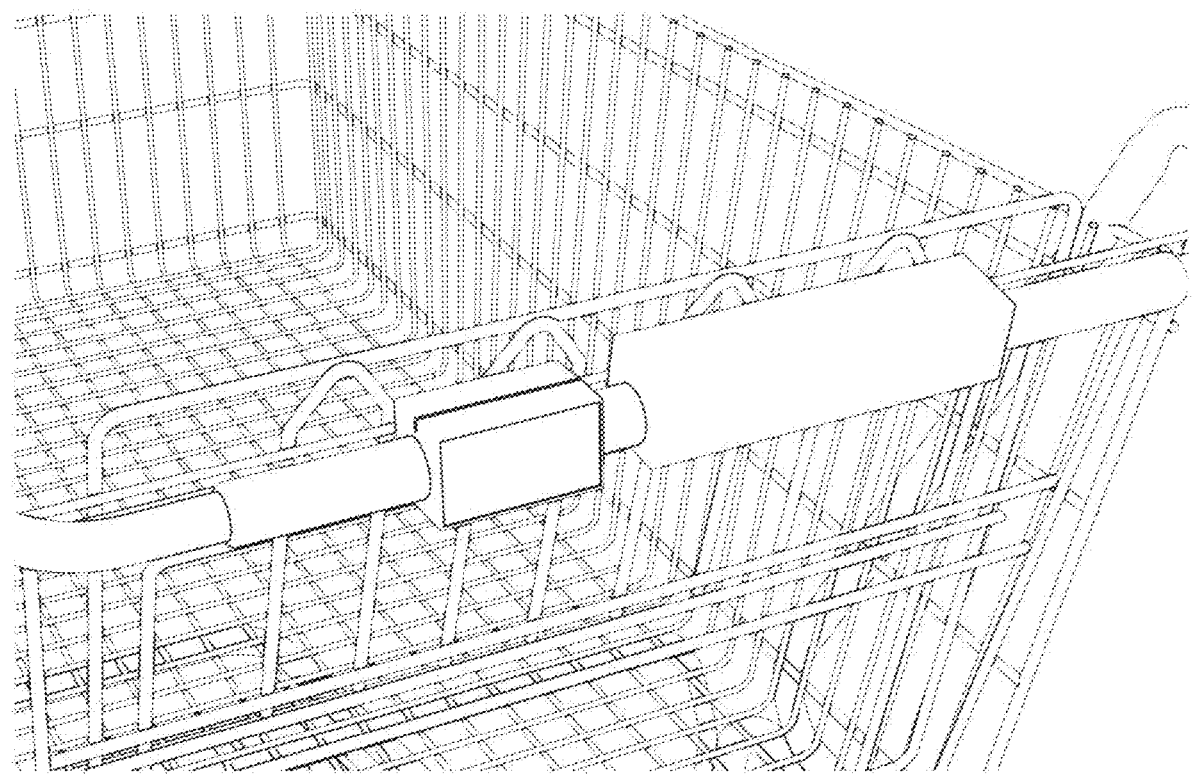
FIG. 6 is a back close up isometric view of the advanced shopping cart of the present invention showing the location of the electronic device and the credit card reader in which at least one of the embodiments of the present invention is shown.

The FastKart could also work with wheels which lock and could set off an alarm if any RFID is not deactivated and the boundaries of the sensor are passed with "RFID active" goods, thus eliminating the need to install turnstiles. However, this feature has its limitations as it will only apply in the case where the FASTKART (cart) is used and does not allow for use of this feature on a smaller, hand-carried basket, or the FASTKart app and regular shopping cart. Also, the need insert cash for payment at the point of exit needs to ensure that there is an inbuilt register at on the gate or close to the gate that is linked to the FASTkart app, to expedite payment process. The features may have to change depending on the utility, to accommodate innovative/changing markets and expansion to smaller retail outlets FIG. 5 is a close up of the front isometric view of the electronic device 500 and the credit card reader 600 attached to a shopping cart. The advanced shopping cart is comprised of a container having a bottom, at least one side, at least two wheels, wherein the container may be used as the basket of a shopping cart. FIG. 6 is a close up of the back isometric view of the credit card reader 600 attached to a shopping cart.

Figure 7:
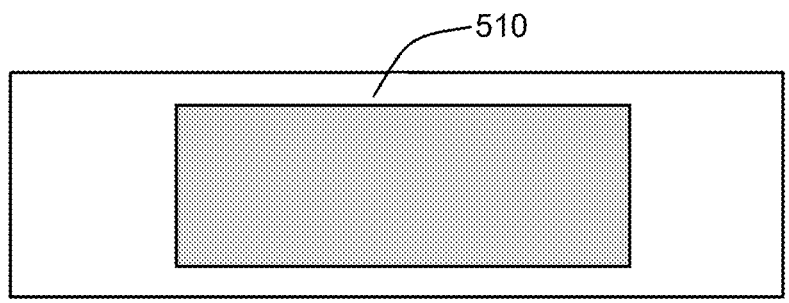
FIG. 7 is a side view of the electronic device of the present invention showing a battery cover that encases a battery, which may be replaceable or rechargeable, in which at least one of the embodiments of the present invention is shown.

FIG. 7 is a side view of the electronic device 500 showing the battery cover 510. The battery cover 510 encases a battery that may be replaceable or rechargeable.

Figure 8:
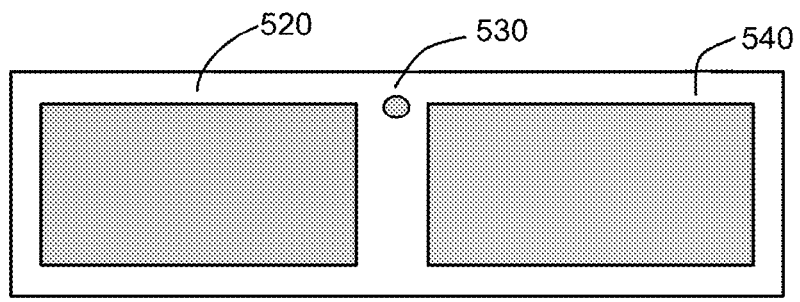
FIG. 8 is a top view of the electronic device of the present invention showing a bar code reader/scanner, an indicator light, and a graphic display in which at least one of the embodiments of the present invention is shown.

FIG. 8 is a top view of the electronic device 500 showing the bar code scanner 520, the indicator light 530, and the graphic display 540.

Figure 9:
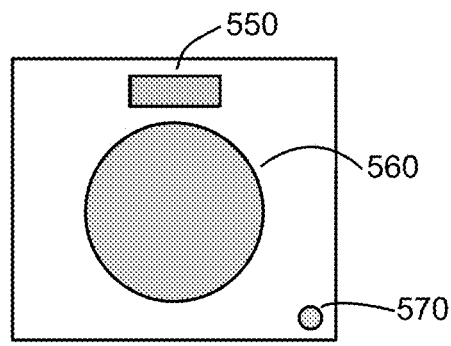
FIG. 9 is an end view of the electronic device of the present invention showing a USB port for transferring a shopping list or other information to the electronic device, a traversing hole for attaching the electronic device to the handle of the advanced shopping cart, and a charging port for charging the battery within the electronic device in which at least one of the embodiments of the present invention is shown.

FIG. 9 is an end view of the electronic device 500 showing the USB port 550, a hole for attaching to the handle of the supermarket 560, and a charging port 570. The USB port may transfer information concerning a user's shopping list.

In at least one embodiment, the functions of the device or method described may be implemented in software, firmware, hardware, or any combination thereof. When implemented in software, the functions may be transmitted, as one or more instructions or code on, over or stored on at least one computer-readable medium. The computer-readable media may include both communication media and computer storage media, including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. It should be understood in this disclosure that Bluetooth is the same as any wireless communication. The term memory may include volatile or non-volatile (e.g., floppy disks, hard disks, CD-ROMs, flash memory, read-only memory (ROM), and random access memory (RAM)).

The method comprises receiving data from a specialized shopping device, over a cellular, wireless, satellite, or other network to a special purpose computer with a non-transitory computer readable medium. In one or more of the embodiments, the functions described herein may be implemented in any combination of hardware, software, firmware, etc. The functions may be stored or transmitted as one or more software instructions, computer-executable instructions, or processor-executable instructions, or code on a tangible non-transitory computer readable medium or on a non-transitory processor-readable storage medium, if implemented in software. The steps of an algorithm, process, or method disclosed herein may be embodied in a processor-executable software module that may reside on a non-transitory computer readable medium. Non-transitory computer readable medium readable media includes both computer storage media and communication media including any medium that facilitates transfer of a computer program from one place to another. A non-transitory storage media may be any available media that may be accessed by the special purpose host computer system.

By way of an example, and not as a limitation, a non-transitory computer readable medium may comprise Random-Access Memory (RAM), Read-Only Memory (ROM), Programmable Read-Only Memory (PROM), Erasable Programmable Read-Only Memory (EPROM), Electrically Erasable Programmable Read-Only Memory (EEPROM), Compact Disc Read-Only Memory (CD-ROM) or other optical disk storage, magnetic disk storage, or other optical or magnetic storage devices, or any other medium that may be used to store program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically or optically with lasers.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium or an a non-transitory computer readable medium, which may be incorporated into a computer program product. All illustrations of the drawings are for the purpose of describing selected versions of the present invention and are not intended to limit the scope of the present invention.

All of these embodiments and the invention disclosed herein are intended to be within the scope herein disclosed. These and other embodiments of the invention will become readily apparent to those skilled in the art from the detailed description of the preferred embodiments having reference to the attached figures, the embodiments not being limited to any particular, preferred embodiments disclosed. Also, the invention disclosed herein suitably may be practiced in the absence of any element which is not specifically disclosed herein.

Although the invention has been explained in relation to its preferred embodiment, it is to be understood that many other possible modifications and variations may be made without departing from the spirit and scope of the invention. While certain embodiments have been shown and described, it will be understood that there is no intent to limit the invention by such disclosure, but rather, is intended to cover all modifications and alternate constructions falling within the spirit and scope of the invention as defined in the appended claims.

What is claimed is:

1. A portable product scanning and payment system, comprising:
   a. at least one container, said container comprising a bottom and at least one side, wherein said container takes the form of a basket of a shopping cart;
   b. at least two wheels, said wheels connecting to the bottom of said container;

c. at least one handle, said handle connecting to the top of said container;
d. a point-of-sale device;
e. an electronic device with at least one traversing hole for attaching to the handle, wherein said electronic device comprises:
   i. a battery cover;
   ii. a battery;
   iii. a barcode scanner;
   iv. an indicator light;
   v. a USB port;
   vi. a charging port;
   vii. a GPS;
   viii a microphone;
   ix. at least one processor, wherein the at least one processor analyzes a customer's shopping list, compares the shopping list to a store's inventory, determines a location in the store of each item on the customer's shopping list, and tags each item with a characteristic selected from a group consisting of less travel, heavy items first, and frozen items last to generate a shopping list showing a desired path of travel for the customer to follow in the store, and wherein the at least one processor executes an algorithm that directs the customer to purchase grocery items selected from the group consisting of less expensive and more nutritious;
   x. at least one modem;
   xi. at least one non-transitory computer readable medium comprising an algorithm embodied in a processor-executable software module capable of software instructions to direct the customer to grocery items desired by the customer in a path of travel selected from a group consisting of less travel, heavy items first, and frozen items last, and further comprising an algorithm that directs the customer to purchase grocery items selected from the group consisting of less expensive and more nutritious; and
   xii. a graphic display, wherein the graphic display shows the location of products on a map within the store along with the individual cost and nutritional value of each product that is scanned is displayed along with the total cost and nutritional value of all products that are scanned.

2. The scanning and payment system of claim 1, wherein the container is capable of holding products selected from a group consisting of groceries, sundries, foodstuffs, personal care items, toiletries, pet foods, medications, stationary, office supplies, cleaning supplies, personal hygiene supplies, and other household supplies non-transitory computer readable medium comprises.

3. The scanning and payment system of claim 1, further comprising a scale attached to the bottom of the container, wherein the scale is capable of measuring the weight of products placed inside the container to compare with the total weight calculated from the information on the barcodes of the products scanned to determine if all of the items placed in the container were properly scanned.

4. The scanning and payment system of claim 1, further comprising a processor that is mounted within the container, wherein the processor is capable of calculating the total cost of the items placed in the container from the information read by the barcode scanner, reading payment information entered into the point-of-sale device, and completing the transaction.

5. The scanning and payment system of claim 1, further comprising a speaker that is mounted on the container, wherein the speaker is capable of transmitting a notification selected from a group consisting of an audible tone, visual lights, vibration through the handle of the container, an electronic notification to a store employee, and a combination of one or more of these methods.

6. The scanning and payment system of claim 1, wherein the speaker is capable of notifying a person if all of the items in the container are not paid for prior to the customer exiting the store through the use of an audible, visual, vibratory, or other alarming means.

7. The scanning and payment system of claim 1, wherein the container is configured in sections to allow for the insertion of reusable bags.

8. The scanning and payment system of claim 1, wherein the wheels of the container are configured to auto-lock if a user attempts to leave the store without paying for all of the products.

9. The scanning and payment system of claim 1, wherein the system may cause a gate to not open, if a user attempts to leave the store without paying for all of the products.

10. The scanning and payment system of claim 1, wherein the GPS of the container system is configured to show the location of products on a map on the graphic display.

11. The scanning and payment system of claim 1, wherein the point-of-sale device attaches to the handle and may comprise a credit card reader.

12. The scanning and payment system of claim 1, wherein the electronic device is capable of being attached to the handle.

13. The scanning and payment system of claim 1, wherein the battery is selected from a group consisting of replaceable batteries and rechargeable batteries.

14. The electronic shopping device of claim 1, wherein the battery is selected from a group consisting of replaceable batteries and rechargeable batteries.

15. The electronic shopping device of claim 1, wherein the indicator light may illuminate different colors depending on if the cart is activated and in use, when payment is processed, when payment has not been processed, and when the turnstile barrier is approached.

16. An electronic shopping device, comprising:
a. a credit card reader;
b. a battery cover;
c. a battery; wherein the battery is selected from a group consisting of replaceable batteries and rechargeable batteries;
d. a barcode scanner;
e. an indicator light, wherein the indicator light may illuminate different colors depending on if the device is activated and in use, when payment is processed, and when payment has not been processed;
f. a USB port, wherein the USB port may transfer information concerning a user's shopping list;
g. a charging port;
h. a GPS, wherein the GPS is mounted on a container to enable a customer to locate desired products within a store quickly and efficiently;
i. at least one microphone;
j. at least one processor, wherein the at least one processor analyzes a customer's shopping list, compares the customer's shopping list to a store's inventory, determines the location in the store of each item on the customer's shopping list, and tags each item with a characteristic selected from a group consisting of less travel, heavy items first, and frozen items last to generate a shopping list showing a desired path of travel for the customer to follow in the store, and wherein the at least one processor executes an algorithm that directs the customer to purchase grocery items selected from the group consisting of less expensive and more nutritious;
k. at least one modem;
l. at least one non-transitory computer readable medium comprising an algorithm embodied in a processor-executable software module capable of software instructions to direct the customer to grocery items desired by the customer in a path of travel selected from a group consisting of less travel, heavy items first, and frozen items last, and further comprising an algorithm that directs the customer to purchase grocery items selected from the group consisting of less expensive and more nutritious; and
m. a graphic display, wherein the graphic display shows the location of products on a map within the store along with the individual cost and nutritional value of each product that is scanned is displayed along with the total cost and nutritional value of all products that are scanned.

17. The electronic shopping device of claim 16, further comprising a speaker, wherein the speaker is capable of transmitting a notification selected from a group consisting of an audible tone, visual lights, vibration, an electronic notification to a store employee, and a combination of one or more of these methods.

18. The electronic shopping device of claim 16, wherein the GPS is configured to show the location of products on a map on the graphic display.

* * * * *